United States Patent Office 3,792,132
Patented Feb. 12, 1974

3,792,132
PROCESS FOR PREPARING ALKYL PHENYL PHOSPHATE AND PHOSPHOROTHIONATE COMPOUNDS
Donald Norman Bernhart, Mount Pleasant, Tenn., assignor to Stauffer Chemical Company, New York, N.Y.
No Drawing. Filed Dec. 21, 1970, Ser. No. 100,554
Int. Cl. C07f 9/18, 9/12
U.S. Cl. 260—973        16 Claims

ABSTRACT OF THE DISCLOSURE

A process for producing phosphorus acid esters of the formula:

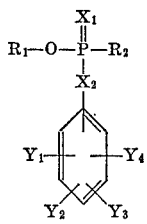

by the reaction of a phenolic compound with a phosphonochloridate, phosphorochloridate, phosphonochlorothioate or phosphorochlorothioate compounds in a reaction matrix consisting essentially of an oxygenated solvent, an amine and a basic metal compound. The reaction matrix can contain substantial quantities of water.

BACKGROUND OF THE INVENTION

The present invention is a method for preparing phenyl phosphorus compounds. Particularly, the present invention relates to a method for the preparation of esters of acids of phosphorus.

More particularly, the present invention relates to a process for the preparation of alkyl phenyl phosphorus acid ester compounds of the formula:

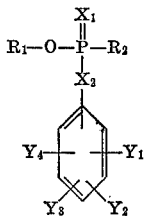

by the reaction of a phenolic compound of the formula:

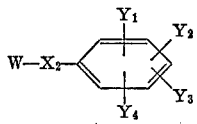

with a phosphorus compound of the formula:

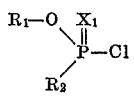

wherein R is alkyl of from 1 to about 8 carbon atoms, $R_2$ is selected from the group consisting of alkyl from 1 to about 8 carbon atoms, alkoxy of from 1 to about 8 carbon atoms, aryl, aryloxy, alkaryl, alkoxyaryl, alkaryloxy, alkoxyaryloxy and amino, $X_1$ and $X_2$ are independently selected from the group consisting of sulfur and oxygen and $Y_1$, $Y_2$, $Y_3$ and $Y_4$ are independently selected from the group consisting of hydrogen, nitro, halo, lower alkoxy, cyano, hydroxyalkyl, alkylmercapto, halo substituted alkyl, and carboxy and W can be hydrogen, an alkali metal moiety or an amine salt moiety.

Alkyl phenyl esters of phosphorus acids are well known compounds and have been prepared by the reaction of phosphorochloridates, phosphonochloridates, phosphorochloridothioates and phosphonochloridothioates and phenolic compounds in inert organic solvents in the presence of aliphatic or heterocyclic tertiary amines as described in U.S. Pat. 2,471,464. The alkyl phenyl esters of phosphorus acids have also been prepared in inert ketone solvents as described in U.S. Pat. 2,520,393 by adding a suitable phenol to an alkali metal compound such as sodium carbonate in the oxygenated solvent then adding the phosphorochloridate, phosphonochloridate, phosphonochloridothioate, or phosphorochloridothioate compound to the mixture.

The preparation methods hertofore available have been characterized by long reaction times at high temperatures under anhydrous conditions. The product was usually dark colored and was difficut to free of inorganic salts produced by the reaction.

Due to the long reaction times and high temperatures, it was necessary to conduct the reaction in an anhydrous matrix to obtain commercially acceptable yields. As noted in U.S. Pat. 2,520,393, water and alcohols react with phosphorochloridate and phosphorochlorothioate compounds to reduce the yields of the reaction product.

The drying or dehydrating of phenolate compounds required in known processes is expensive, time consuming and at times hazardous.

Even though a process which can utilize water in the reaction matrix has the advantage that the inorganic salts produced by the reaction could be directly removed as a solution in water and reduced process difficulties inherent in handling slurries wet reaction processes are not used commercially because of the reduced yields experienced in these processes.

It is an object of this invention to provide a method to produce alkyl phenol phosphorus acid ester compounds in short reaction times. It is a further object of the present invention to produce alkyl phenyl phosphorus acid ester compounds in high yields in short reaction times. A further object of the present invention is to provide a process for the preparation of alkyl phenyl phosphorus acid ester compounds in short reaction times, in high yields in the presence of water.

The alkyl phenyl phosphorus acid ester compounds produced by the process of the present invention find utility as insecticides, herbicides and oil additives.

SUMMARY OF THE INVENTTION

According to the present invention, alkyl phenyl phosphorus acid ester compounds of the formula:

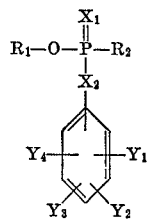

are prepared by the reaction of a phenolic compound of the formula:

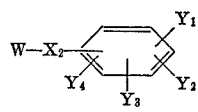

with a phosphorus compound of the formula:

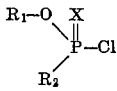

wherein $R_1$ is alkyl of from 1 to about 8 carbon atoms, $R_2$ is selected from the group consisting of alkyl of from 1 to about 8 carbon atoms, alkoxy of from 1 to about 8 carbon atoms, aryl, aryloxy, alkaryl, alkoxyaryl, alkaryloxy, alkoxyaryloxy and amino, $X_1$ and $X_2$ are independently selected from the group consisting of sulfur and oxygen and $Y_1$, $Y_2$, $Y_3$ and $Y_4$ are independently selected from the group consisting of hydrogen, nitro, halo, cyano, lower alkoxy, halo substituted alkyl, hydroxyalkyl, alkylmercapto, and carboxy and W is selected from the group consisting of hydrogen, alkali metal moiety and amine salt moiety, in a reaction medium consisting essentially of an oxygenated solvent, an amine and a basic metal compound. The reaction proceeds rapidly and produces yields of products essentially equivalent to the prior art anhydrous reactions with water present in the reaction mixture. When the process is conducted under anhydorus conditions in the reaction matrix of the present invention, the reaction can be completed in shorter reaction times with higher yields than prior art processes.

DETAILED DESCRIPTION OF THE INVENTION

The reaction between phenolic compounds and phosphonochloridates, phosphorochloridates, phosphonochloridothioates or phosphorochloridothioates is well known and is generally thought to proceed according to the following scheme:

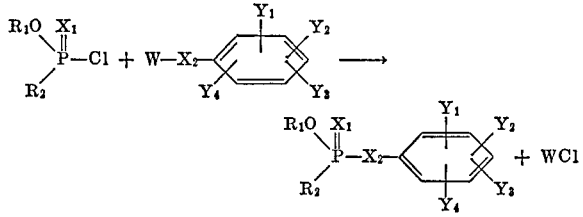

when W is hydrogen, a sufficient amount of a strongly alkaline compound is usually present to neutralize the phenol or react with the hydrogen chloride formed thus providing a reaction mixture containing large amounts of salts of the alkaline compound.

The process of the present invention is carried out by providing a phenolic compound in a reaction medium consisting essentially of an oxygenated solvent, an amine and a basic metal compound. Water need not be present; however, the reaction proceeds rapidly so that water in the reaction medium has little effect on the reaction. The presence of water in the reaction matrix aids in the removal of the inorganic salts from the organic reaction product.

A reaction matrix is prepared by forming a mixture of the oxygenated solvent and the amine. A basic metal compound and the phenolic compound are then added to the reaction mixture. If a phenoxide, phenolate or phenyl mercaptide is to be utilized, the compound can be added to the reaction mixture with the water with which it is admixed or it can be added in an anhydrous condition. The water if present can be in the form of the hydrate of the reagent, a solution of the reagents or can enter adventitiously. The basic metal compound preferably can be added at from about 0.2% to about 30% by weight of the reactants.

When a phenol or thiophenol is to be utilized at least a sufficient amount of a basic alkali metal compound to neutralize the phenol or thiophenol and to provide from about 0.2% to about 30% excess by weight based on the reactants is preferably added to the reaction mixture. The phenol or thiophenol compound is then added to the reaction mixture. When the basic metal compound is a carbonate it is preferred to add about one mole of carbonate for each mole of phenol in addition to the 0.2% to 30% excess based on the weight of the reactants. If water is present in the reaction mixture it is preferred to add the phosphorochloridate, phosphonochloridate, phosphorochloridothioate or phosphonochloridothioate compound to be reacted to the reaction mixture containing the phenolic compound to obtain the highest yields.

A stoichiometric amount of the phosphorochloridate, phosphonochloridate, phosphorochloridothioate or phosphonochloridothioate compound needed to react with the phenlic compound is preferably added to the reaction mixture. A stoichiometric amount is not critical but best yields can be obtained when the phosphorochloridate, phosphonochloridate, phosphorochloridothioate or phosphonochloridothioate compound is present in a stoichiometric quantity or slightly less than a stoichiometric quantity to react with the phenolic compound. By stoichiometric amount is meant amounts sufficient to provide equal molecular quantities of each reactant.

The reaction mixture can be maintained between about 25° C. and about 130° C. and preferably between about 40° C. and 90° C. to complete the reaction. The reaction is usually completed in less than six hours and usually in from about 15 minutes to two hours.

As used herein, oxygenated solvent denotes a ketone or ester composition containing from about 5 to about 10 carbon atoms. The preferred ketones and esters are solvents for the phenols, thiophenols, phenolates and phenyl mercaptides and are immiscible with water. Ketones such as methyl isobutyl ketone, 2-pentanone, diisopropyl ketone, cyclohexanone, 3-hexanone, 3-heptanone, acetophenone amyl ethyl ketone, dibutyl ketone and the like are examples of ketones which can be useful in the practice of the present invention. Esters such as propyl acetate, butyl acetate, 2-ethyl-butyl acetate, octyl acetate, ethyl propanoate, butyl propanoate, pentyl propanoaet, ethyl butyrate, butyl butyrate, amyl butyrate, propyl valerate, butyl hexanoate, benzyl acetate and the like are examples of ester solvents which can be useful in the practice of the present invention. Due to its low cost, ready availability and physical properties, methyl isobutyl ketone is the preferred solvent for the practice of the present invention.

The amines useful in the practice of the present invention are the alkyl and heterocyclic tertiary amines. Amines such as triethylamine, tripropylamine, tributylamine, N-methylmorpholine, N-ethylmorpholine, hexamethylenetetramine and the like are examples of the amines useful in the practice of the present invention. The heterocyclic amines preferably contain only one nitrogen atom and carbon atoms in the ring structure. Aliphatic secondary amines and aliphatic aryl amines may also be employed as catalysts, but they are not as effective as the aliphatic and heterocyclic tertiary amines. Due to its ready availability, and high effectiveness, triethylamine, is the preferred amine for use in the process of the present invention.

As little as about 0.01% by weight of the amine based on the total weight of the reactants has been found to cause the reaction to proceed rapidly. Preferably from about 0.1% to about 10.0% of the amine based on the weight of the reactants is utilized. Larger amounts of amines can be employed but have not been found to be advantageous to the process.

The phenolic compounds useful in the practice of the present invention are the phenols, thiophenols, and the alkali metal phenoxides, phenolates and mercaptides which are the reaction products of a phenol or thiophenol and a basic alkali metal compound. The alkali metal phenoxide, phenolate or phenyl mercaptide compounds can be preformed and added to the reaction matrix or the phenol or thiophenol and a sufficient amount of an alkali metal compound to form the phenoxide, phenolate or phenyl mercaptide can be added to the reaction matrix. The phenoxides, phenolates and phenyl mercaptides can be provided in admixture with water, the water-phenolate or phenyl mercaptide mixture can be added to the oxygenated solvent-amine-basic metal compound mixture without drying and the reaction can be carried out without need for removing the water from the reaction system. This is a distinct advantage over the prior art since the water can be utilized to solubilize the inorganic salts formed during the reaction thus simplifying the subsequent washing of the reaction mixture.

Phenolic compound is used herein to denote phenols, thiophenols, phenolates, phenoxides and phenyl mercaptide compounds of the formula:

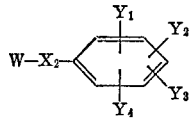

wherein $X_2$ can be sulfur or oxygen and W is hydrogen, an amine salt moiety or an alkali metal moiety and $Y_1$, $Y_2$, $Y_3$ and $Y_4$ can be hydrogen, nitro, halo, cyano, lower alkoxy, halosubstituted alkyl, hydroxyalkyl, alkylmercapto and carboxy. It is intended that two Y groups can be connected to form groups such as are present in compounds such as unbelliferone.

Typical phenolic compounds useful in the practice of the present invention are:

sodium-4-chloro-2-nitrophenoxide,
potassium-2-nitro-4-methylphenoxide,
sodium-2,4-dichloro-6-nitrophenoxide,
sodium-p-nitrophenolate,
sodium-p-cyanophenolate,
sodium phenylmercaptide,
sodium-p-chlorophenylmercaptide,
potassium-p-nitrophenyl mercaptide,
sodium-2-methyl-4-cyanophenyl mercaptide,
sodium-3-chloro-4-nitrophenyl mercaptide,
sodium-o-hydroxymethyl phenolate,
potassium-2-methyl-4-cyanophenolate,
sodium-3-methyl-4-nitrophenolate,
potassium-3-chloro-4-nitrophenolate,
sodium-2-nitro-4-nitrophenolate,
sodium-2-methoxy-4-cyanophenolate,
potassium-2,6-dinitro-4-methylphenolate,
potassium-2-ethoxy-4-cyanophenolate,
sodium-4-chlorophenolate,
4-methyl-3-chloroumbelliferone, the corresponding phenols, thiophenols and the like. Phenolic compounds such as:

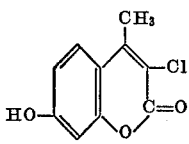

are intended to fall within the scope of the phenolic compounds useful in the practice of the present invention. The examples of the phenolic compounds are presented for illustrative purposes only and are not intended to encompass all possible compounds which are intended to fall within the scope of the present invention.

The phenols, thiophenols, phenoxides, phenolates, and phenyl mercaptide useful in the practice of the present invention are well known compounds and can be prepared by methods known in the art.

The phosphonochloridate, phosphorochloridate, phosphonochloridothioate and phosphorochloridothioate compounds useful in the practice of the present invention are compounds of the formula:

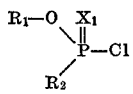

wherein $X_1$ is sulfur or oxygen, and $R_1$ is alkyl, of from 1 to about 8 carbon atoms and $R_2$ is alkyl off rom 1 to 8 carbon atoms, alkoxy of from 1 to 8 carbon atoms, aryl, aryloxy, alkoxyaryl, alkaryloxy, alkoxyaryloxy, and amino.

Alkyl is used herein to denote an aliphatic or cyclo aliphatic moiety containing from 1 to about 8 carbon atoms. The alkyl moieties may be substituted with halogen atoms, particularly chlorine and bromine, and preferably substituted in no more than 3 places.

Alkoxy is used herein to denote an alkyl moiety connected to the remainder of the molecule through an oxygen atom. Lower alkoxy is used herein to denote an alkyl moiety containing up to about four carbon atoms connected to the remainder of the molecule through an oxygen atom. Examples of lower alkoxy moieties are methoxy, ethoxy propoxy, butoxy and the like.

Aryl is used herein to denote an aromatic moiety containing not more than a single ring. The moiety may have halogen substituents on the ring. Alkaryl as used herein denotes an aryl moiety containing alkyl substituents of up to about 8 carbon atoms and may contain halogen substituents.

Aryloxy as used herein denotes an aryl moiety connected to the remainder of the molecule through an oxygen atom. Alkoxyaryl is used herein to denote an aryl moiety having alkoxy substituents, alkoxyaryloxy denotes an aryloxy moiety having alkoxy substituents.

The following examples of phosphonochloridate, phosphorochloridate, phosphonochloridothioate and phosphorochloridothioate compounds useful in the practice of the present invention are presented for illustrative purposes only and are not intended to fully encompass all useful compounds within the scope of the present invention. Compounds such as dimethyl phosphorochloridate, dimethyl phosphorochloridothioate, diethyl phosphorochloridate, diethyl phosphorochloridothioate, dipropyl phosphorocholridothioate, o-ethyl phenyl phosphonochloridate, o-butyl phenyl phosphonochloridothioate, dihexyl phosphorochloridate, ethyl-4-methylphenyl phosphorochloridate, o-propyl phenyl phosphonochloridothioate, o-methyl-N-isopropyl phosphoroamidochloridothioate and the like.

The phosphonochloridate, phosphorochloridate, phosphonochloridothioate, phosphorochloridothioate compounds can readily be prepared by methods described in the "Journal of the American Chemical Society," vol. 67, No. 10, p. 1663, and in Phosphorus and Its Compounds, edited by John R. Van Wazer, vol. II, pp. 1221 to 1266, Interscience Publishers, Inc., New York (1961).

Halogen is used herein to denote bromine, chlorine and fluorine; cyano is used herein to denote the —CN radical; nitro is used herein to denote the —NO₂ radical; amino is used herein to denote the

radical and carboxy is used herein to denote a

moiety.

The process of the present invention is conducted under alkaline conditions, that is, the pH of the reaction mixture is maintained above about 7. It is preferred to conduct the process at a pH of from about 7.5 to about 12 and most preferably at a pH of from about 8 to about 11.5. As the pH of the reaction mixture is increased above about 12, the reaction takes place rapidly but the reaction product is dark colored and requires additional purification steps to provide the light colored products desirable for commercial utilization.

The alkaline pH is maintained by the addition of basic metal compounds to the reaction matrix. Basic metal compounds is used herein to denote the inorganic compounds which when added to the reaction matrix provide a pH above about 7. The basic metal compounds are salts of alkali and alkaline earth metals. The basic metal compounds useful in the practice of the present invention include compounds such as sodium carbonate, potassium carbonate, magnesium carbonate, barium carbonate, lithium carbonate, sodium hydroxide, potassium hydroxide, calcium hydroxide, magnesium oxide, calcium oxide, trisodium phosphate, potassium pyrophosphate and the like. The preferred basic metal compounds are sodium carbonate and potassium carbonate.

The basic metal compounds can be present at from about 0.2% to about 30% by weight of the reactants. When a phenol is utilized, an alkali metal compound is preferably utilized in about 0.2% to about 30% based on the weight of the reactants in excess of that required to form the alkali metal salt of the phenol. The amount of basic metal compound is not critical but best yields are obtained when a sufficient amount of basic metal compound is provided to maintain the pH of the reaction matrix between about 8.0 and about 12. Excess basic metal compound must be washed from the reaction mixture and large excesses unduly hamper the final washing operation.

The following are examples of alkyl phenyl phosphorus acid ester compounds which are prepared by the process of the present invention. The examples are presented for illustrative purposes only and are not intended to encompass all compounds which can be prepared by the method of the present invention.

solvent, tertiary amine and basic metal compound. It is not certain how the combination of the oxygenated solvent, tertiary amine and basic metal compound act to provide the rapid reactions experienced in the process of the present invention, but the reactions are completed in shorter reaction times, at lower temperatures than processes which utilize a reaction matrix of a basic metal compound in an oxygenated solvent or a tertiary amine in an inert organic solvent.

The speed of the reaction is disclosed in a comparison of the following examples. The reactions were followed by periodic gas chromatographic analysis of the reaction mixture to determine when the reactions were complete. The product was separated, weighed and the percent yield was calculated by dividing the weight recovered by the theoretical amount of product and multiplying the resultant figure by the purity of the product.

EXAMPLE 1

Preparation of diethyl-p-nitrophenyl phosphorothionate

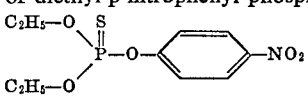

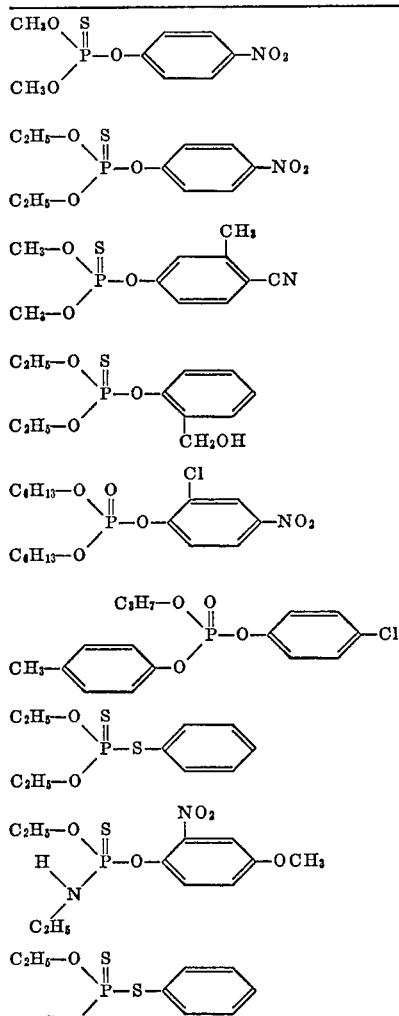
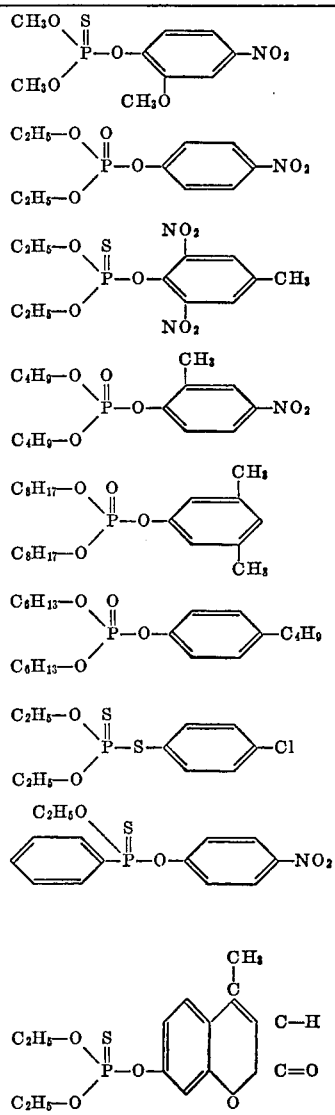

The reaction of the phenolic compound and the phosphonochloridate, phosphorochloridate, phosphonochloroidothioate or phosphorochloridothioate to form the esters of phosphorus acids is an extremely rapid one when conducted in a reaction matrix comprising the oxygenated To a 500 milliliter three-neck flask, equipped with a stirrer, thermometer and heating mantle were added 50 milliliters of methyl isobutyl ketone. Thirty-five grams (0.25 mole) of p-nitrophenol and 30 grams (0.29 mole) of sodium carbonate were added to the methyl isobutyl ketone. The contents of the flask were heated to 60° C. with stirring and 47.1 grams (0.25 mole) of diethyl phosphorochloridothioate were added over a 30 minute period. The temperature was maintained between 60° C. and 70° C. The reaction was complete in 6 hours after the addition of diethyl phosphorochloridothioate was complete. The reaction mixture was washed with 250 milliliters of water, then by two washings each with 150 milliliters of 1% sodium hydroxide. The aqueous phase was separated from the phase containing the diethyl-p-nitrophenyl phosphorothionate. The organic phase was stripped of solvent at 20 millimeters mercury pressure. There remained 67.7 grams of a light yellow material which assayed 99% diethyl-p-nitrophenyl phosphorothioate indicating a yield of 97.5 percent.

EXAMPLE 2

The preparation of diethyl-p-nitrophenyl phosphorothionate as in Example 1 was repeated. In the preparation 0.7 grams of triethylamine was added to the methyl isobutyl ketone before the sodium carbonate and p-nitrophenol were added to the mixture. The reaction was complete in less than 30 minutes after the addition of the diethyl phosphorochloridothioate. Yield of diethyl-p-nitrophenyl phosphorothionate 98.2%.

EXAMPLE 3

The preparation of Example 2 was repeated except that 0.32 gram of triethylamine was added to the reaction mixture. The reaction was complete in 1¼ hours. Yield of diethyl-p-nitrophenyl phosphorothionate 97.8%.

The comparison of Examples 2 and 3 with Example 1 indicates that the addition of the tertiary amine to the oxygenated solvent basic metal compound mixture increases the reaction rate by 6 to 12 times.

A comparison of Example 1 of U.S. Pat. 2,471,464 wherein diethyl-p-nitrophenyl phosphorothionate was prepared by the reaction of sodium p-nitrophenol and diethyl phosphorochlorothioate in a reaction matrix of chlorobenzene and triethylamine at 100–110° C. in two hours with a 91% yield with Example 2 shown above discloses that the process of the present invention provides a higher yield (98.2% vs. 91%) in a shorter reaction time (30 minutes vs. 2 hours) at a lower temperature (60° C. vs. 100° C.).

The great speed of the reaction in the reaction matrix of an oxygenated solvent, tertiary amine and basic metal compound is unexpected in view of the known processes.

EXAMPLE 4

Preparation of diethyl-p-nitrophenyl phosphorothionate in presence of water.

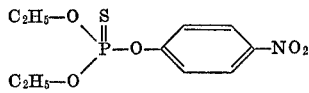

To a 500 milliliter three neck flask, equipped with a stirrer, thermometer, and heating mantle were added 60 milliliters of methyl isobutyl ketone and 0.70 grams of triethylamine. The stirrer was started and 52.5 grams of 78% sodium-p-nitrophenolate (0.25 mole) in water and 3 grams of solium carbonate were slowly added to the mixture. The temperature was raised to 60° C. Diethyl phosphorochloridothioate in an amount of 47.1 grams (0.25 mole) was added over a three minute period and the reaction proceeded for one hour at 65° C. to 70° C. After one hour, gas chromatograph analysis showed the reaction to be complete. The reaction mixture was washed with 100 milliliters of water, then by two washings each with 150 milliliters of 1% sodium hydroxide. The aqueous phase was separated from the phase containing the diethyl-p-nitrophenyl phosphorothionate and the organic phase was stripped of solvent at 20 millimeters pressure. There remained 65.9 grams of a light yellow material which assayed, 99.3% diethyl-p-nitrophenyl phosphorothionate, indicating a yield of 94.7%.

EXAMPLE 5

Example 4 was repeated using .32 gram of triethyl amine instead of .7 gram. Reaction was completed in 2¼ hours with a 95.6% yield.

EXAMPLE 6

Example 4 was repeated using 0.12 gram of triethyl amine. Reaction was completed in 5½ hours with a 95.6% yield.

EXAMPLE 7

Example 4 was repeated using 0.12 gram of treithyl amine and 5 grams of sodium carbonate. The reaction was completed in three hours with a 95.8% yield.

EXAMPLE 8

Preparation of dimethyl-p-nitrophenyl phosphorothionate

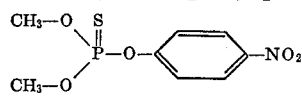

To a 500 milliliter three neck flask equipped with a stirrer, thermometer and heating mantle were added 60 milliliters of methyl isobutyl ketone. To the solvent in the flask was added 0.32 gram of triethyl amine. The stirrer was started and 52.5 grams (0.25 mole) of 78% sodium-p-nitrophenolate in water and 5 grams of sodium carbonate were charged to the flask and the temperature raised to 50° C. Dimethyl phosphorochloridothioate in an amount of 40.2 grams (0.25 mole) was added to the mixture over a three minute period, and the reaction temperature maintained at 50° C. to 55° C. The reaction was completed in two hours. The reaction mixture was washed and dried as in Example 1 and a light yellow product was obtained. The yield was 94.2% of dimethyl-p-nitrophenyl phosphorothionate.

EXAMPLE 9

Example 8 was repeated at 45° C. to 50° C. The reaction was completed in 4¼ hours and a 93.6% yield was obtained.

EXAMPLE 10

Preparation of propyl phenyl-2-chloro-4 nitrophenyl phosphorothionate

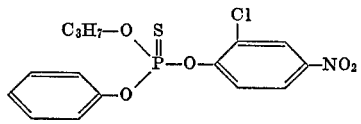

To a 500 milliliter three neck flask equipped with a stirrer, thermometer and heating mantle are added 60 milliliters of isopropyl propanoate. The stirrer is started and 1.5 grams of N-methylmorpholine are added to the reaction flask. Sodium-2-chloro-4-nitrophenolate in the amount of 48.8 grams (0.25 mole) in admixture with 20 grams of water and 5 grams of sodium carbonate are added to the N-methylmorpholine-isopropyl propanoate mixture and the temperature is slowly raised to 60° C. Propylphenyl phosphorochloridothioate in an amount of 62.7 grams (0.25 mole) is added in three to five minutes. The reaction is permitted to stir at 65° C. for an additional two hours. The reaction mixture is cooled to room temperature. The reaction mixture is washed three times each with 150 milliliters of water followed by a washing with 150 milliliters of 1% sodium hydroxide. The aqueous phase is separated from the organic phase and the solvent is stripped at 20 millimeters of mercury pressure. A light colored propyl phenyl-2-chloro-4-nitrophenyl phosphorothionate is produced.

EXAMPLE 11

Preparation of dimethyl-4-cyanophenyl phosphorothionate

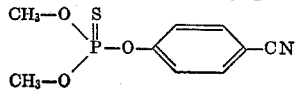

To a three neck 500 milliliter flask equipped with a stirrer, thermometer and a heating mantle are added 60 milliliters of methyl propyl ketone. The stirring is started and 1.8 grams of tripropylamine are added to the reaction vessel. To the reaction vessel are then added 5 grams of potassium carbonate and 50.3 grams of 70% sodium-p-cyanophenolate (.25 mole) in water and the temperature is increased to 50° C. To the reaction mixture is then added in approximately five minutes 41.2 grams (.25 mole) of dimethyl phosphorochloridothioate. The reaction mixture is stirred at 60° C. for an additional two hours. The reaction mixture is cooled to room temperature and the crude reaction product is washed with 100 milliliters of water and then two 150 milliliter portions of 1% sodium hydroxide. The aqueous phase is separated. The solvent is stripped from the organic phase at 20 millimeters mercury pressure. On the removal of the solvent, the remainder is light colored dimethyl-4-cyanophenyl phosphorothionate as analyzed by gas chromatography.

EXAMPLE 12

Preparation of diethyl-p-methylphenyl phosphate

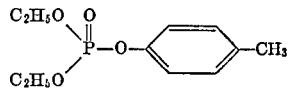

To a 500 milliliter three neck flask equipped with a stirrer, thermometer and heating mantle are added 60 milliliters of 4-heptanone and 2.6 grams tributylamine. The stirrer was started and 27.1 grams (0.25 mole) of p-cresol and 45.5 grams (0.33 mole) of potassium carbonate are added to the mixture in the flask. The temperature is raised to 75° C. and 40.6 grams (0.25 mole) of diethyl phosphorochloridate are added over a 30 minute period. The temperature is maintained at 75° C. for 1 hour after all the diethyl phosphorochloridate is added. The reaction mixture is washed with two 200 milliliter portions of water and then by two 150 milliliter portions of 1% sodium hydroxide. The aqueous phase is separated from the organic phase. The solvent is stripped from the organic phase. A light colored diethyl-p-methylphenyl phosphate remains.

EXAMPLE 13

Preparation of O,O-diethyl-s-phenyl phosphorodithioate

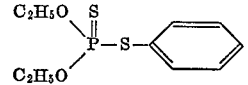

To a 500 milliliter three neck flask equipped with a stirrer, thermometer and heating mantle were added 60 milliliters of methyl isobutyl ketone and 0.70 grams of triethyl amine. The stirrer was started and 27.5 grams (0.25 mole) of thiophenol and 30 grams (0.29 mole) of sodium carbonate were added to the methyl isobutyl ketone-triethyl amine mixture in the flask. The contents of the flask were slowly heated to 60 C. and 47.1 grams (0.25 mole) of diethyl phosphorochloridothioate were added over a 30 minute period. The temperature was maintained between 60° C. and 70° C. for a period of one hour after the addition of the diethyl phosphorochloridothioate was complete. The reaction mixture was washed with 250 milliliters of water then by two washings each with 150 milliliters of 1% sodium hydroxide. The aqueous phase was separated from the organic phase containing the O,O'-diethyl-s-phenyl phosphorodithioate. The organic phase was stripped of solvent. There remained a light colored O,O'-diethyl-s-phenyl phosphorodithioate.

EXAMPLE 14

Preparation of O,O-diethyl-s-p-chlorophenyl phosphorodithioate

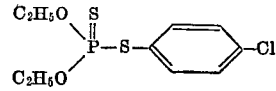

The procedure of Example 13 was repeated except that 0.25 mole of p-chlorothiophenol was substituted for the thiophenol. A light colored O,O-diethyl-s-p-chlorophenyl phosphorodithioate was obtained.

EXAMPLE 15

Preparation of O-ethyl-s-phenyl ethyl phosphonodithioate

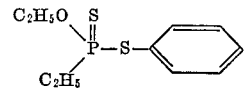

To a 500 milliliter three neck flask equipped with a stirrer, thermometer and heating mantle are added 60 milliliters of propyl acetate and 1.75 grams of triethyl amine. The stirrer is started and 27.5 grams (0.25 mole) of thiophenol and 41.6 grams (0.30 mole) of potassium carbonate are added to the propyl acetate-triethyl amine mixture in the flask. The contents of the flask are slowly heated to 65° C. and 43.1 grams (0.25 mole) of O-ethyl ethyl phosphonochloridothioate are added to the mixture in the flask over a 30 minute period. The temperature is maintained between 60° C. and 65° C. for one hour after the addition of the o-ethyl ethyl phosphonochloridothioate is completed. The reaction mixture is washed with 250 milliliters of water then by two washings each with 150 milliliters of 1 percent sodium hydroxide. The aqueous phase is separated from the organic phase. The organic phase is stripped of solvent. There remains light colored O-ethyl-s-phenyl ethyl phosphonodithioate.

EXAMPLE 16

Preparation of O-methyl-N-isopropyl-2,4-chlorophenyl phosphonothionate

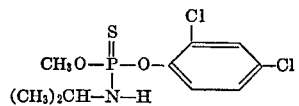

To a 500 milliliter three neck flask equipped with a stirrer, thermometer and heating mantle are added 80 milliliters of 2-pentanone and 2.0 grams of N-ethyl morpholine. The stirrer is started and 40.75 grams (0.25 mole) of 2,4-dichlorophenol and 35 grams (0.34 mole) of sodium carbonate are added to the 2-pentanone N-ethyl morpholine mixture in the flask. The contents of the flask are slowly heated to 65° C. and 46.8 grams (0.25 mole) of O-methyl-N-isopropyl phosphoroamidochloridothioate are added to the flask over a 30 minute period. The reaction mixture is maintained at 60° C. to 65° C. for two hours after the addition of the O-methyl-N-isopropyl phosphoroamidochloridothioate is complete. The reaction mixture is washed with 250 milliliters of water then by two washings each with 150 milliliters of 1 percent sodium hydroxide. The aqueous phase is separated from the organic phase. The organic phase is stripped of solvent. There remains a light colored O-methyl-N-isopropyl-2,4-chlorophenyl phosphorothionate.

What is claimed is:
What is claimed is:
1. In a process for preparing alkyl phenyl esters of phosphorus acids of the formula:

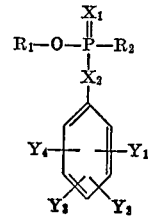

by the reaction of a phenolic compound of the formula:

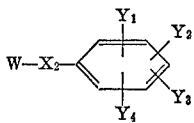

with a phosphorus compound of the formula:

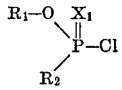

under alkaline conditions wherein $R_1$ is alkyl of from 1 to about 8 carbon atoms, $R_2$ is selected from the group consisting of alkyl of from 1 to about 8 carbon atoms, alkoxy of from 1 to about 8 carbon atoms, phenyl, phenoxy, alkylphenyl wherein the alkyl group contains from 1 to about 8 carbon atoms, alkoxyphenyl wherein the alkoxy group contains from 1 to about 8 carbon atoms, alkoxyphenoxy wherein the alkoxy group contains from 1 to about 8 carbon atoms and amino of the structure $$R-N-\atop H$$

wherein R is lower alkyl, $X_1$ and $X_2$ are independently selected from the group consisting of sulfur and oxygen, $Y_1$, $Y_2$, $Y_3$ and $Y_4$ are independently selected from the group consisting of hydrogen, nitro, halo, lower alkyl, lower alkoxy, cyano, hydroxyalkyl containing from 1 to about 8 carbon atoms, alkylmercapto containing from 1 to about 8 carbon atoms, halogenated substituted alkyl containing from 1 to about 8 carbon atoms and

wherein the

group is attached to the phenyl through the oxygen and the carbon is attached to a moiety attached to the phenyl to form the umbelliferone structure and W is selected from the group consisting of hydrogen and alkali metal; the improvement which comprises conducting the reaction in a reaction matrix consisting essentially of an oxygenated solvent selected from the group consisting of ketones and carboxylic acid esters containing from about 5 to about 10 carbon atoms, at least 0.01% by weight of the reactants of an amine selected from the group consisting of alkyl and heterocyclic tertiary amines containing a single ring and a basic metal compound selected from the group consisting of inorganic compounds of alkali metal and alkaline earth metals which when added to the reaction matrix provide a pH above 7.

2. The process of claim 1 wherein the reaction matrix contains water.

3. The process of claim 1 wherein the tertiary amine is triethyl amine.

4. The process of claim 1 wherein the oxygenated solvent is selected from the group consisting of ketones and esters containing from 5 to about 10 carbon atoms which are immiscible with water.

5. The process of claim 1 wherein the oxygenated solvent is methyl isobutyl ketone.

6. The process of claim 1 wherein the oxygenated solvent is methyl isobutyl ketone and the amine is triethyl amine.

7. The process of claim 1 wherein the phenolic compound is sodium-p-nitrophenolate and the phosphorus compound diethyl phosphorochlorothioate.

8. The process of claim 1 wherein the phenolic compound is p-nitrophenol and the phosphorus compound is diethyl phosphorochlorothioate.

9. The process of claim 1 wherein the phenolic compound is sodium-p-nitrophenolate and the phosphorus compound is dimethyl phosphorochlorothioate.

10. The process of claim 1 wherein the phenolic compound is p-nitrophenol and the phosphorus compound is dimethyl phosphorochlorothioate.

11. The process of claim 1 wherein the phenolic compound is p-cyano-phenol and the phosphorus compound is dimethyl phosphorochlorothioate.

12. The process of claim 1 wherein the phenolic compound is sodium-p-cyanophenolate and the phosphorus compound is dimethyl phosphorochlorothioate.

13. The process of claim 1 wherein the reaction is conducted at from about 40° C. to about 90° C.

14. The process of claim 1 wherein the pH is maintained between about 7.5 and about 12.

15. The process of claim 1 wherein the basic metal compound is selected from the group consisting of sodium carbonate, potassium carbonate, magnesium carbonate, barium carbonate, lithium carbonate, sodium hydroxide, potassium hydroxide, calcium hydroxide, magnesium oxide, calcium oxide, trisodium phosphate, potassium pyrophosphoate and the like.

16. The process of claim 1 wherein the pH is maintained between about 8 and about 11.5.

References Cited
UNITED STATES PATENTS

| | | | |
|---|---|---|---|
| 2,495,108 | 1/1950 | Kosolapoff | 260—973 XR |
| 2,520,393 | 8/1950 | Fletcher | 260—973 XR |
| 3,149,143 | 9/1964 | Newallis et al. | 260—973 XR |
| 2,897,226 | 7/1959 | Britton et al. | 260—973 XR |

ANTON H. SUTTO, Primary Examiner

U.S. Cl. X.R.

260—343.5, 940, 949, 951, 954, 959, 961, 964, 965